Patented Oct. 24, 1950

2,526,759

UNITED STATES PATENT OFFICE 2,526,759

PLATE FOR PHOTOENGRAVING AND ENAMEL THEREFOR

Walter W. MacDonald, Kansas City, Mo.

No Drawing. Application April 6, 1949, Serial No. 85,936

2 Claims. (Cl. 95—7)

This invention relates to plates for photoengraving and enamel therefor and more particularly to a sensitizing enamel coating material for preparing plates used in photoengraving and such coated light sensitive plates adapted to have an image applied thereto.

In common practice of preparing plates used in photoengraving, the engraver has his own formula and mixes the various ingredients to form the enamel just prior to using same as neither the bulk enamel nor the plates coated therewith can be kept for any extended period without deterioration. The copper plates are usually bought in large sheets, the engraver cutting same to the desired size. One face of the plate is then polished with a pumice and the engraver coats said polished face of the plate with his enamel which he has prepared just prior to starting the operation. The coated plate is then placed on a whirling device which tends to spread the enamel evenly over the surface, the speed of the whirling device determining the thickness of the enamel. The enameled plate is dried during the whirling. The plate when it is removed from the whirling device is the sensitized plate which is exposed to light with a photographic film or plate whose image is to be reproduced interposed between a light source and the coated plate. The image is transferred by this process to the plate and said sensitized coating on the plate becomes hardened and water insoluble wherever it is exposed to light. The plate is then developed or otherwise washed wherein the parts exposed to the light in the exposing process remain on the plate and those parts not exposed to the light wash off. The plate is then heated by a suitable burner or the like which burns in or bakes the enamel remaining on the plate, the baked enamel plate being placed in an etching machine wherein the chemicals remove copper from the areas not protected by enamel.

The instability of such enamels and plates coated therewith prevents any quantity of plates from being prepared and kept for any period of time in an unexposed condition. This deterioration occurs in the enamel solution and also in the enameled plate prior to exposure, and various types of preservatives have been tried without success in attempts to provide a sensitizing solution which may be kept for a long period of time without deterioration.

The objects of the present invention are to provide a sensitizing enamel composition suitable for use in photoengraving and which may be kept for long periods of time without deterioration; to provide an enamel coated plate for photoengraving which will retain its sensitivity for long periods of time; to provide as an article of manufacture a plate having a light sensitive coating adapted for mass production and sale of precoated plates having predetermined exposure characteristics; and to provide a plate for photoengraving and enamel therefor which has superior printing qualities.

The sensitizing enamel composition prior to application to the copper plate is in the form of a liquid and contains egg albumen, photoengraving glue, bichromate of ammonia, citrate of iron, strong ammonia water and distilled water. When these ingredients are properly mixed chemical action will take place in the mixture which will cause the liquid to last for a long time without any deterioration. An example of the proportions of the ingredients in the enamel is twelve (12) ounces egg albumen, sixteen (16) ounces of photoengraving glue, one and one-half (1½) ounces of bichromate of ammonia, forty (40) grams of citrate of iron, thirty (30) drops of strong ammonia water, and sixty-eight (68) ounces of distilled water.

In the manufacture of the composition enamel in batch form, for example, twelve (12) ounces of distilled water and twelve (12) ounces of egg albumen are mixed in a suitable container and thoroughly beaten until the egg albumen is frothy. Sixteen (16) ounces of photoengraving glue is dissolved in thirty-two (32) ounces of distilled water to form a liquid. After the glue is thoroughly dissolved in the water to make liquid glue, said quantity of liquid glue is divided and half is beaten thoroughly into the egg albumen and water mixture. Then the other half of the liquid glue is added to the egg albumen mixture and thoroughly stirred therein. One and one-half (1½) ounces of bichromate of ammonia is dissolved in twenty (20) ounces of distilled water and the solution thereof is thoroughly mixed into the egg albumen mixture. Forty (40) ounces of citrate of iron is dissolved in four (4) ounces of distilled water and the solution thereof thoroughly mixed into the albumen mixture. Thirty (30) drops of what is termed strong ammonia water is then added to the albumen mixture and the entire batch thoroughly mixed or beaten. The container of the entire batch of said ingredients is then covered and allowed to set until the foam is settled into the solution. It is preferable to allow said solution to set for from six (6) to eight (8) hours. The solution is then filtered carefully as it is essential that no particles remain in the solution as any particles would leave a rough surface on the final sensitized plate and ruin the engraving. After filtering the solution is allowed to set for twenty-four (24) hours before using, said solution being stored in a dark place at all times. I have found that the sensitizing enamel composition in the solution form can be kept almost indefinitely if stored in a dark place in a sealed container.

Relatively large size copper plates preferably all of the same dimensions are polished on one face with a pumice stone, then thoroughly cleaned. The sensitizing solution is then flowed on and the plate whirled face down over a burner to heat and dry the coating on the copper plate, the flame being so arranged as not to contact the plate. The speed of whirling the plate determines the thickness of the coating and also the exposure time which varies with said thickness. It is preferable to vary the thickness of the coating according to the depth of the etch that is to be made in the plate. After the coating is dried on the copper plate it is sheared to form a number of similar plates of any standard size which are in turn wrapped in suitable paper and packaged in a light tight package for storage and shipment to the trade as desired.

It has been found that sensitized plates coated as described with this enamel have a relatively fast exposure time when exposed to arc light, for example with ordinary strip film the exposure time varies from four (4) to five (5) minutes, when a thirty-five (35) ampere arc lamp is utilized and spaced from thirty (30) to thirty-five (35) inches from the plate. However, the sensitized plate has relatively low sensitivity to ordinary room light, permitting the plate to remain uncovered during the setting up period and allowing the operator more time in handling the plate while it is in its sensitized form for preparation in exposure and developing. The conventional practice of exposure, washing and etching is preferably followed in the making of the finished plates.

It is believed obvious that photoengraving plate enamel of the composition described offers advantages, particularly in its ability to be kept for long periods of time without deterioration. Also the long lasting qualities of plates coated with said enamel and low sensitivity thereof to ordinary room lights permits said coated plates to be made up as an article of manufacture and sold to the trade, thereby eliminating the necessity of the engraver in each shop from mixing his own solution every few days and coating or otherwise preparing the plate just prior to making the exposures for each engraving prepared.

What I claim and desire to secure by Letters Patent is:

1. A sensitizing enamel composition for coating photoengraving plates which comprises, twelve (12) ounces of egg albumen, sixteen (16) ounces of photoengraving glue, one and one-half (1½) ounces of bichromate of ammonia, forty (40) grams of citrate of iron, thirty (30) drops of strong ammonia water, and sixty-eight (68) ounces of distilled water.

2. As a new article of manufacture, a plate for use in photoengraving having a surface comprising an enamel containing in the following proportions twelve (12) ounces egg albumen sixteen (16) ounces of photoengraving glue, one and one-half (1½) ounces bichromate of ammonia, forty (40) grams citrate of iron, thirty (30) drops of strong ammonia water and sixty-eight (68) ounces of distilled water, said enameled plate being characterized by its stability whereby it may be kept for long periods of time in unexposed condition without deterioration.

WALTER W. MacDONALD.

REFERENCES CITED

The following references are of record in the file of this patent:

UNITED STATES PATENTS

| Number | Name | Date |
|---|---|---|
| 915,666 | Dodge | Mar. 16, 1909 |

OTHER REFERENCES

Inland Printer, Feb. 1930, page 96, "Enamel for Zinc and Copper." (Copy in P. O. Library.)

Ilford Manual of Process Work, 4th ed., 1946, L. P. Clerc, pp. 200–208, paragraphs 189–200 particularly cited.